United States Patent
Zhou et al.

(10) Patent No.: US 7,422,667 B1
(45) Date of Patent: Sep. 9, 2008

(54) ELECTROCHEMICAL DEPOSITION OF CARBON NANOPARTICLES FROM ORGANIC SOLUTIONS

(75) Inventors: Dan Zhou, St. Peter, MO (US); Lee Chow, Orlando, FL (US); Elvira Vladimirovna Anoshkina, Winter Springs, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 627 days.

(21) Appl. No.: 10/699,488

(22) Filed: Oct. 18, 2004

Related U.S. Application Data

(62) Division of application No. 10/119,414, filed on Apr. 9, 2002, now Pat. No. 6,758,957.

(60) Provisional application No. 60/284,360, filed on Apr. 17, 2001.

(51) Int. Cl.
C25B 9/06 (2006.01)
C25B 3/00 (2006.01)
B82B 3/00 (2006.01)

(52) U.S. Cl. .................. 204/230.1; 204/229.8; 204/242; 977/742; 977/842; 977/899

(58) Field of Classification Search .................. 205/202
See application file for complete search history.

(56) References Cited

U.S. PATENT DOCUMENTS

| | | | |
|---|---|---|---|
| 4,310,393 A * | 1/1982 | Bell | ........................... 205/439 |
| 4,472,533 A | 9/1984 | Moskovitis | |
| 5,690,807 A | 11/1997 | Clark | ........................ 205/655 |
| 5,693,207 A | 12/1997 | Fromson | |
| 5,973,444 A | 10/1999 | Xu et al. | |
| 6,129,901 A | 10/2000 | Moskovitis et al. | |
| 6,146,227 A | 11/2000 | Mancevski | |
| 6,361,660 B1 | 3/2002 | Goldstein | .............. 204/157.15 |
| 6,638,413 B1 * | 10/2003 | Weinberg et al. | ........... 205/637 |
| 6,650,061 B1 * | 11/2003 | Urayama et al. | ......... 315/169.3 |
| 6,838,297 B2 * | 1/2005 | Iwasaki et al. | ................. 438/20 |
| 2002/0150684 A1 | 10/2002 | Jayatissa | ..................... 427/314 |
| 2002/0159943 A1 * | 10/2002 | Smalley et al. | ........... 423/447.1 |
| 2002/0172968 A1 | 11/2002 | Kudo | ......................... 429/232 |
| 2003/0102222 A1 * | 6/2003 | Zhou et al. | .................. 205/109 |

* cited by examiner

*Primary Examiner*—Harry D Wilkins, III
(74) *Attorney, Agent, or Firm*—Brian S. Steinberger; Joyce Morlin; Law Offices of Brian S. Steinberger, P.A.

(57) ABSTRACT

Carbon nanoparticles including both nanofilaments and nanotubes produced by an electrochemical deposition method from organic solutions at room temperature, in which the formation and growth of carbon nanoparticles are stimulated by the catalyst, such as iron and nickel. It has been found that the electrochemical deposition conditions have a strong influence on the growth phenomenon of the carbon nanotubes. Scanning electron microscope (SEM) and transmitting electron microscope (TEM) characterizations show that the diameter of nanotubes is of the order of approximately 100 nm, and the length of filaments can be up to approximately 50 µm, depending on the size of catalyst particles.

3 Claims, 5 Drawing Sheets

US 7,422,667 B1

ELECTROCHEMICAL DEPOSITION OF CARBON NANOPARTICLES FROM ORGANIC SOLUTIONS

This is a Divisional of application Ser. No. 10/119,414 filed Apr. 9, 2002 now U.S. Pat. No. 6,758,957 and this invention relates to nanoparticles including both nanotubes and nanofilaments and more particularly relates to carbon nanoparticles deposited by the electrochemical deposition from organic solutions and claims the benefit of priority to United States Provisional Application Serial No. 60/284,360 filed on Apr. 17, 2001.

BACKGROUND AND PRIOR ART

Currently, carbon nanoparticles including both nanotubes and nanofilaments are found in extended commercial applications in modern technologies, for example, for the manufacture of composite materials, nanoscale machines, flat-panel displays, and computer memory devices. The wide application of carbon nanotubes is based on their unique physical and mechanical properties, which show the high electrical and thermal conductivity, and high strength values along the nanotubes' axis. In the direction perpendicular to the fiber axis, these values are very low.

Carbon nanotubes are oftentimes produced by vapor phase deposition on particles of transition metals such as Fe, NJ, and Co in chemical vapor deposition (CVD) reactor (see U.S. Pat. No. 6,146,227 by Mancevski wherein the metal catalysts decompose the hydrocarbides and aid in the deposition of the ordered carbon), by electrochemical deposition of the catalyst followed by CVD at high temperatures (see U.S. Pat. No. 6,129,901 by Moskovits et al), by catalytic plasma enhanced CVD, or by a carbon arc-discharge process.

In recent years, more and more attention is being paid to the electrochemical deposition technique for the manufacture of electronic devices because the electrochemical deposition method is simple, low in capital equipment cost, and can be easily scaled to large scale production.

It would be very important to develop a low temperature, simple process capable of substantial production of nanotubes.

SUMMARY OF THE INVENTION

The first objective of the present invention is to provide carbon nanotubes from a liquid phase.

The second objective of the present invention is to provide carbon nanotubes at a reduced cost.

Another objective of the present invention is to provide carbon nanotubes on an enlarged scale of production.

A preferred embodiment of the invention is the preparation of carbon nanotubes comprising the steps of: providing an electrochemical bath of an organic solution of methanol and benzyl alcohol disposed between and in contact with silicon wafers coated with iron and nickel particles as electrodes; imposing a direct current potential of approximately 1000 volts between said electrodes; and providing a current density of approximately 12 milliamps per square centimeter between said electrodes for a time sufficient that carbon nanotubes of up to approximately 50 µm are developed.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

It would be useful to discuss the meanings of some words used herein and their applications before discussing the novel process of the invention for producing carbon nanotubes including:

SEM—scanning electron microscope
TEM—transmitting electro microscope
Nanotubes—a particle having a hollow body and lengths of from approximately 2 to approximately 10 nano meters
Nanofilaments—a solid particle having lengths of from approximately 2 to approximately 10 nano meters The method of the invention is based on the discovery that it is possible to create nanoparticles including nanofilaments and nanotubes at ambient temperatures by electrochemical decomposition of an organic system in the presence of catalysts such as iron and nickel.

Figure 1:
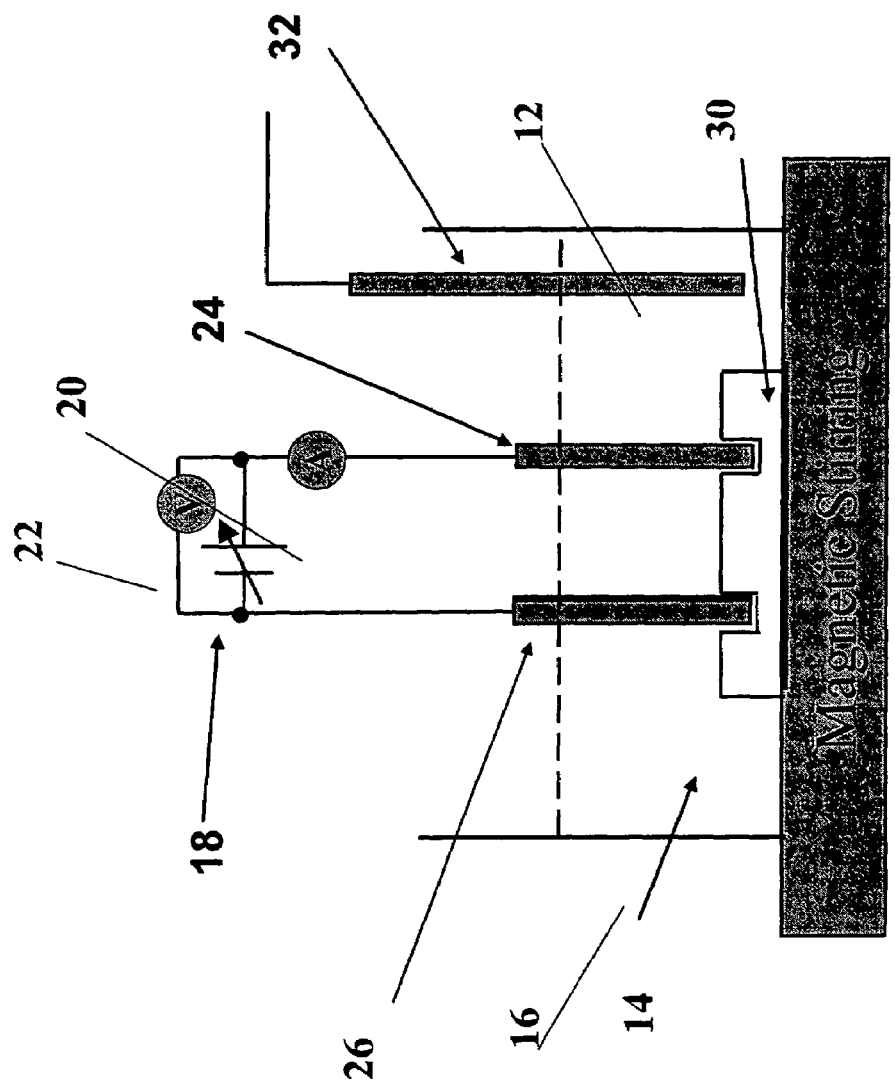
FIG. 1 shows a schematic of the electrochemical deposition apparatus for carrying out the process of the invention.

Refer now to FIG. 1 which presents a schematic representation of the preferred embodiment of the electrochemical deposition apparatus for producing the carbon nanotubes. Electrochemical decomposition of the liquid hydrocarbon 14 takes place in a preferably cylindrical (or any other shape) reaction vessel 16 made of glass or ceramic. The power supply 18 with an ammeter 20 and voltmeter 22 is connected between the anode 24 and cathode 26. Agitation of the liquid is provided with a magnetic stirrer 28 separated from the liquid by a spacer 30. A reference electrode 32 is provided to monitor the electrochemical activity.

The preparation of the carbon nanoparticles which include both nanofilaments and nanotubes is by a catalytic facilitated electrochemical decomposition of an organic solution at ambient temperatures. The decomposition is according to the 2 simultaneous reactions which follow:

$CH_3$-OH C+$H_2$+$H_2O$
$C_6H_5CH_2$-OH 7C+$3H_2$+$H_2O$ which results in the growth and deposition of nanoparticles on the catalytic coated substrates serving as electrodes for the electrochemical reaction.

The nano catalyst particles preferred for use in this invention are produced by evaporating a mixture of nickel and iron in argon onto the silicon substrate at a pressure of a few torrs (approximately 0.01 atmospheres) to produce particulates of from approximately 2 to approximately 10 nano meters deposited onto the substrate.

Figure 2:
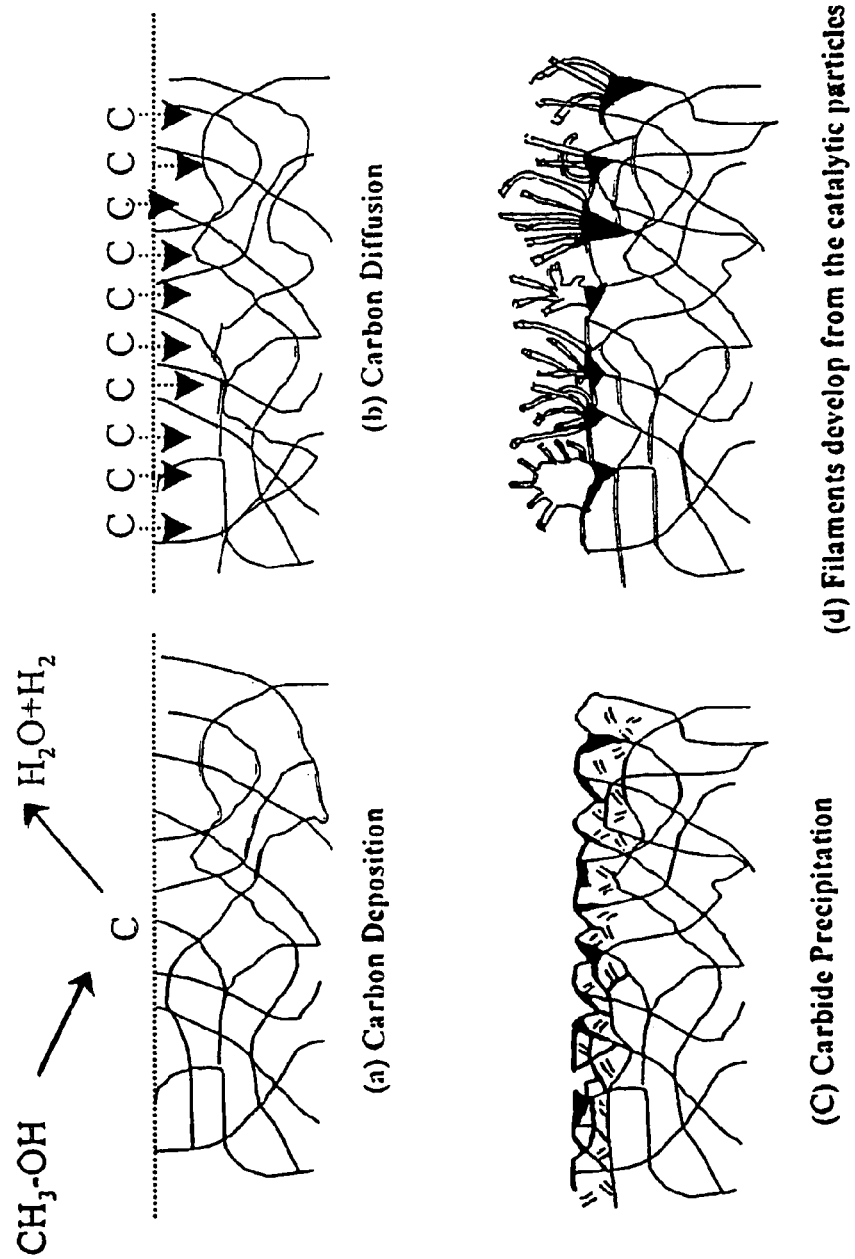
FIG. 2 shows 4 stages in the growth of the nanofilaments.

Reference should now be made to FIG. 2, which shows the four stages in the growth of the nanofilaments on the catalyic coated cathodes during the electrochemical deposition process. The decomposition of the two liquids provides carbon as seen from the two simultaneous chemical reactions which carbon 1(a) deposits on the catalytic particles; 2(b) diffuses into the catalysts; 3(c) grows into a carbide deposit; and 4(d) develops into nanoparticles which are both filaments and tubes.

The process according to this invention utilizes a reaction carried out in a glass container holding a solution of approximately 7 to approximately 40%, preferably approximately 30%, of methanol in benzene alcohol at ambient temperature and a current density of approximately 12 mA/cm² between silicon wafers as the electrodes coated with nanoparticles of equal amounts of iron and nickel ranging from approximately 2 to approximately 10 nano meters and separated by approximately 5 mm with a voltage potential imposed between them of approximately 1000 volts direct current.

The useful parameters of the inventive process the follows:
(a) the process temperature, although broadly defined as ambient, ranges from approximately 10 to approximately 80, preferably approximately 15 to approximately 60, optimally approximately 20 to approximately 30, degrees C.
(b) the current density ranges from a broad range of approximately 5 ($10^4$) to 5 approximately ($10^5$), preferably 2 approximately ($10^5$), de volts/meter.
(c) the suitable ambient pressure for electrochemical decomposition. of the carbon containing solution accordingly to the invention is about 1 atmosphere.
(d) useful substrates as anodes and cathodes include electrically conductive metals of which silicon and stainless steel are exemplary with silicon being the preferred metal which is highly useful in the process of this invention.
(e) the preparation of useful catalysts and particle size ranges is best understood from the article by F. Halperin entitled "Quantum size effects in metal particles" which appeared in the Review of Modern Physics, Vol. 58, No. 3 pp. 533-608 (in particular see page 589) and included the metals iron, cobalt and nickel. The preferred catalysts for this invention are nano particulates of iron and nickel disposed on a silicon electrode having nano diameter sizes ranging from approximately 2 to approximately 10 nano meters.

Figure 3:
FIG. 3 shows carbonaceous deposits including nanofilaments from the process of the invention.
Figure 4:
FIG. 4 shows TEM images of the nanoparticles filaments including hollow structures.
Figure 5:
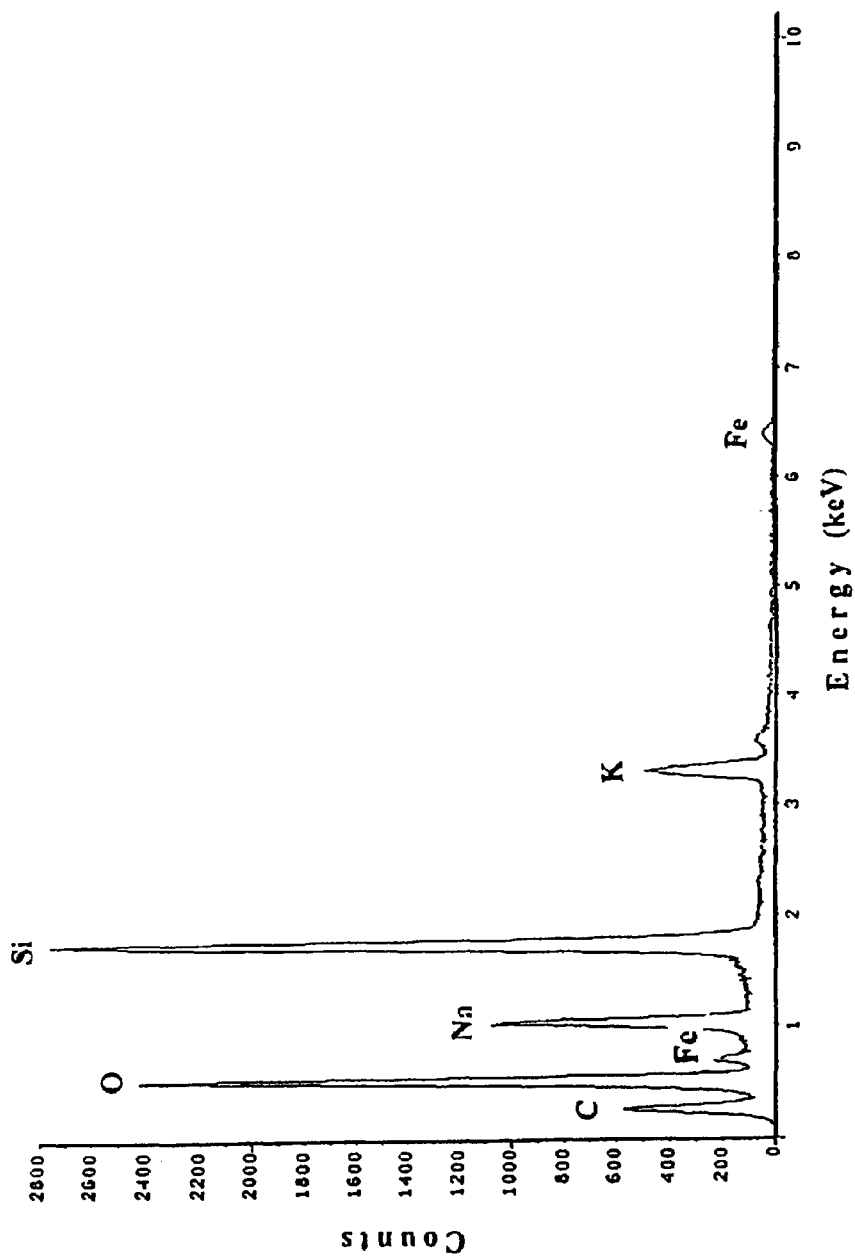
FIG. 5 graphs the EDS spectrum of the carbon nanofilaments.

The carbon nanofilaments and nanotubes prepared by the inventive process can be seen by reference first to: FIG. 3 which shows carbonaceous deposits including nanofilaments from the process of the invention: then on to FIG. 4 which shows TEM images of the nanofilaments including hollow structures; and, finally to FIG. 5 which graphs the EDS spectrum of the carbon nanofilaments.

The deposition of carbon nanoparticles by the inventive electrochemical ambient process has occurred both as bundled and web-like nanofilaments with: the bundle diameters ranging from approximately 50 to approximately 100 nm and lengths of up to approximately 10 nm; and, the web-like diameters ranging from approximately 50 to approximately 200 nm and lengths of approximately 30 to approximately 50 nm.

The disclosed invention makes it possible to produce nanoparticles in a low temperature process. The resulting advantages are many-fold. Firstly, this approach allows the process to be simplified, low cost and readily scaled up at reduced cost. Secondly, many different substrates can be used as the electrode onto which the nanoparticle catalysts are deposited.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An electrochemical deposition apparatus for producing carbon nanoparticles comprising the components of:
   (a) a container having a closed bottom portion and an open top portion, suitable for housing a liquid hydrocarbon selected from at least one of methanol, and benzyl alcohol and mixtures thereof;
   (b) a silicon wafer anode and a silicon wafer cathode each coated with catalytic nanoparticles of iron and nickel, wherein the anode and cathode are spaced apart and positioned in the bottom portion of the container as two electrodes in a plurality of electrodes in said container;
   (c) a magnetic stirrer for agitating the liquid hydrocarbon in the container; and
   (d) a power supply with an ammeter and a voltmeter connected between the anode and the cathode for imposing a direct current potential of approximately 1000 volts between the two electrodes and providing a current density of approximately 12 miliamps per square centimeter between the two electrodes for a time sufficient that carbon nanoparticles are deposited on said the two electrodes, wherein each of the carbon nanoparticles includes:
   a nanotube produced from the organic solution under ambient conditions having a diameter ranging from approximately 50 nm to approximately 100 nm and a length ranging from approximately 2 nm to approximately 50 μm.

2. The apparatus of claim 1, wherein the container for housing the liquid hydrocarbon is made of at least one of glass or ceramic material.

3. The apparatus of claim 1, wherein the plurality of electrodes further includes a reference electrode to monitor the electrochemical activity in the container.

\* \* \* \* \*